UNITED STATES PATENT OFFICE.

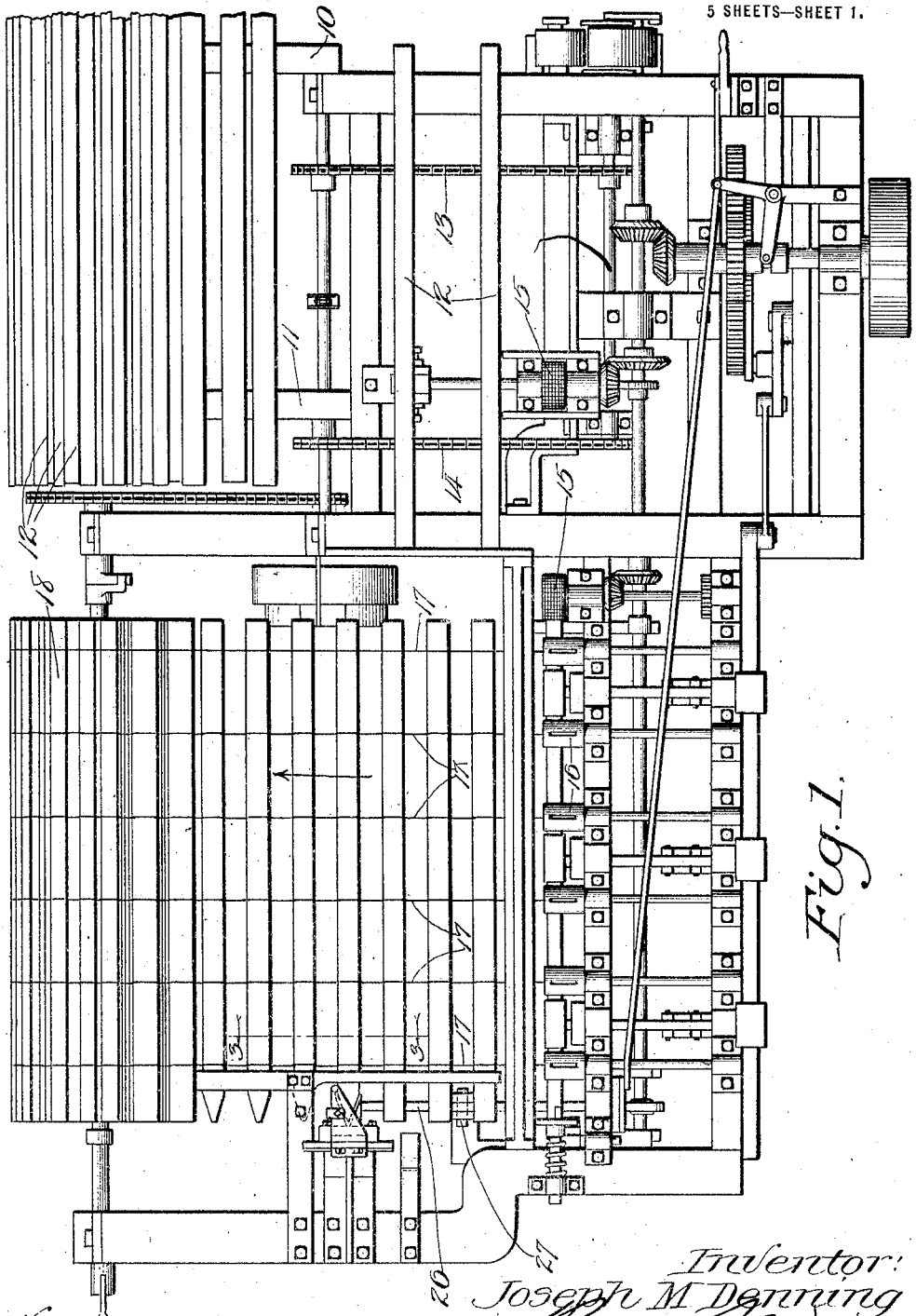

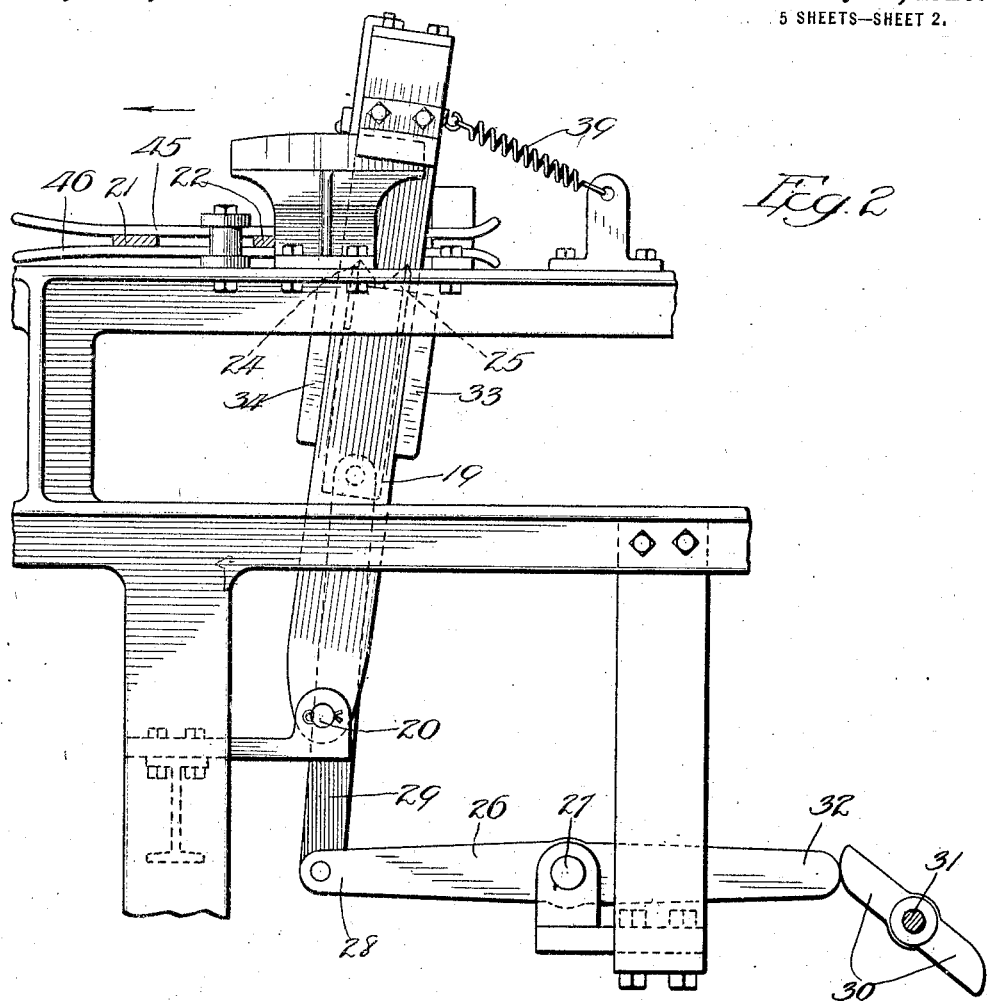

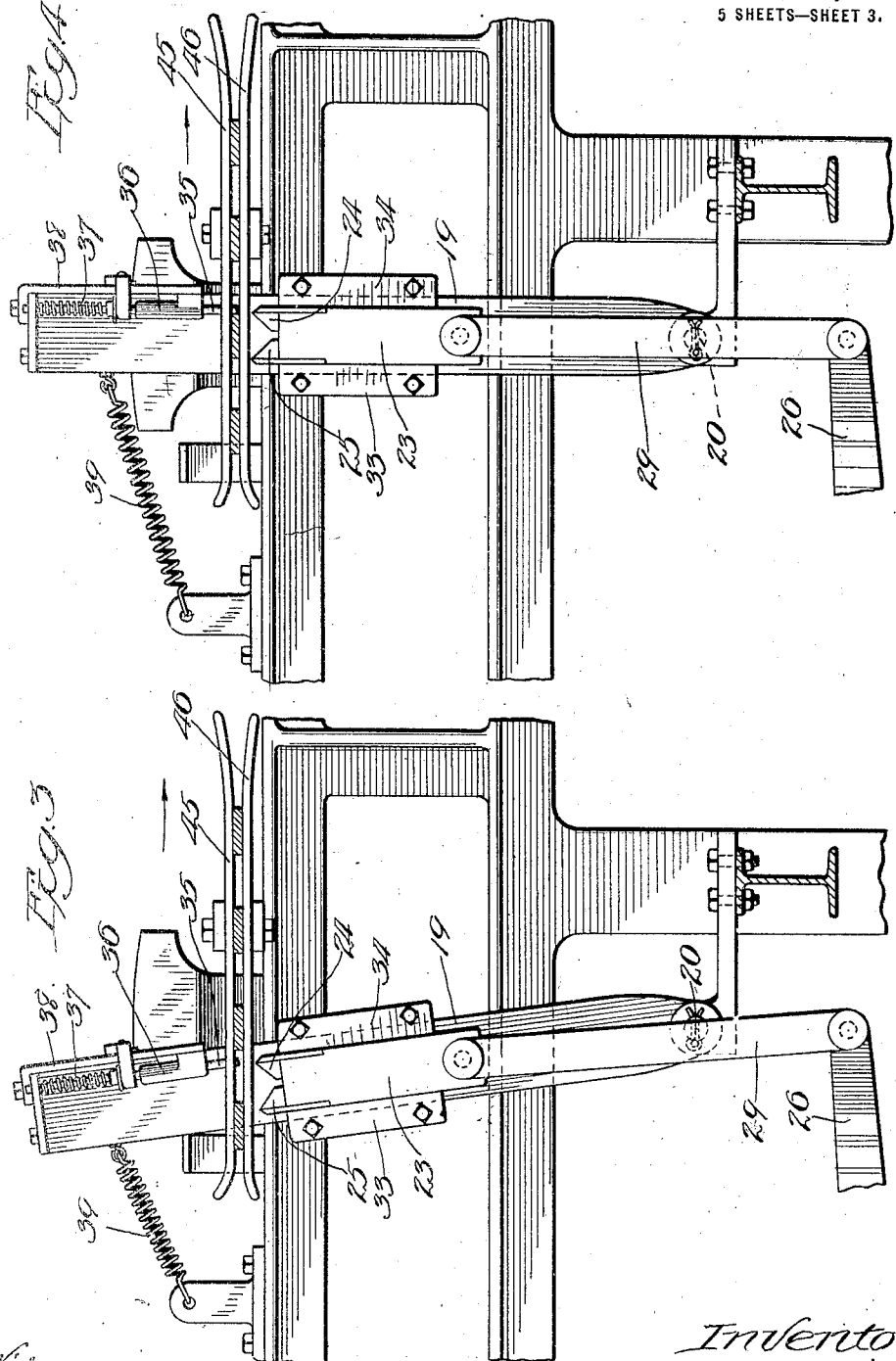

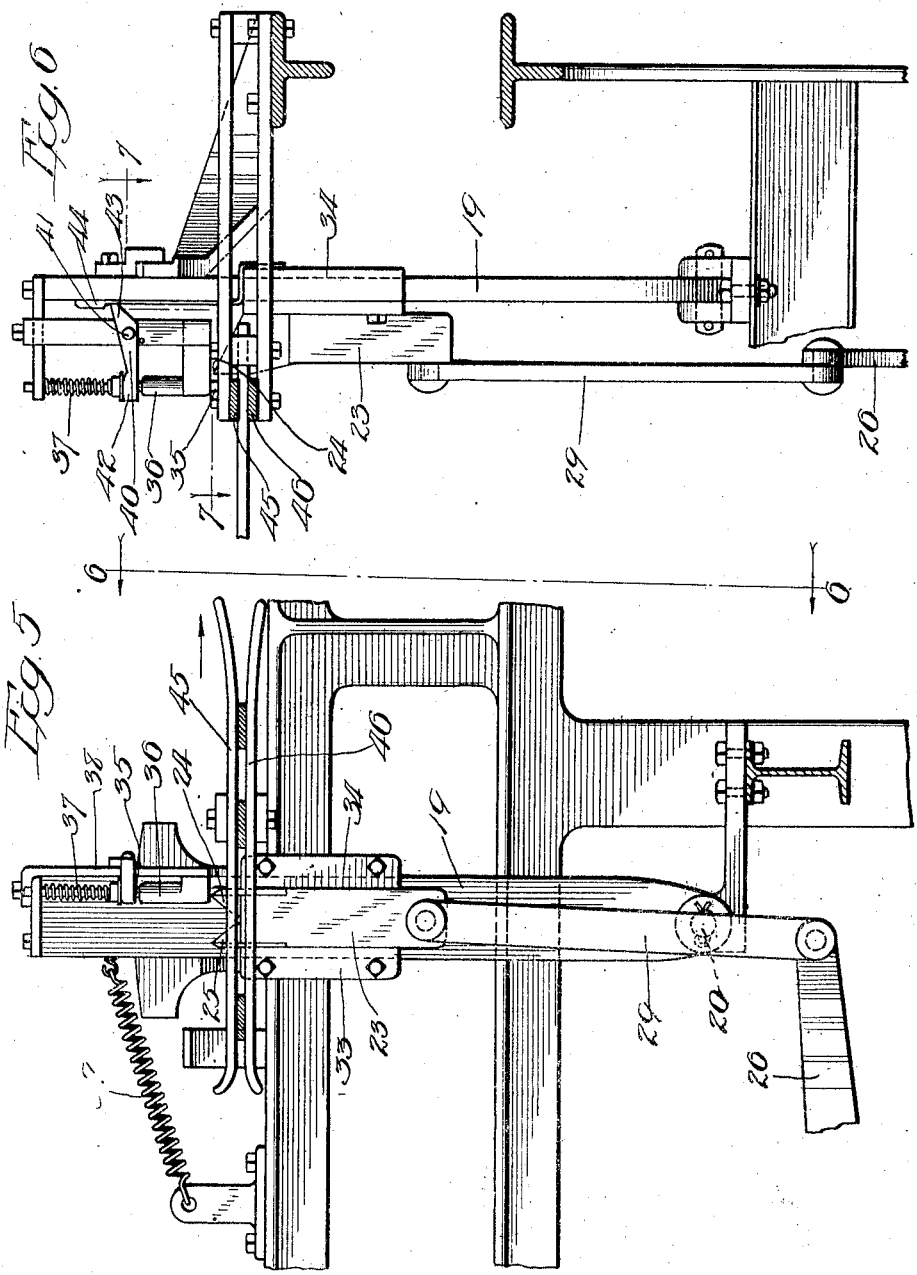

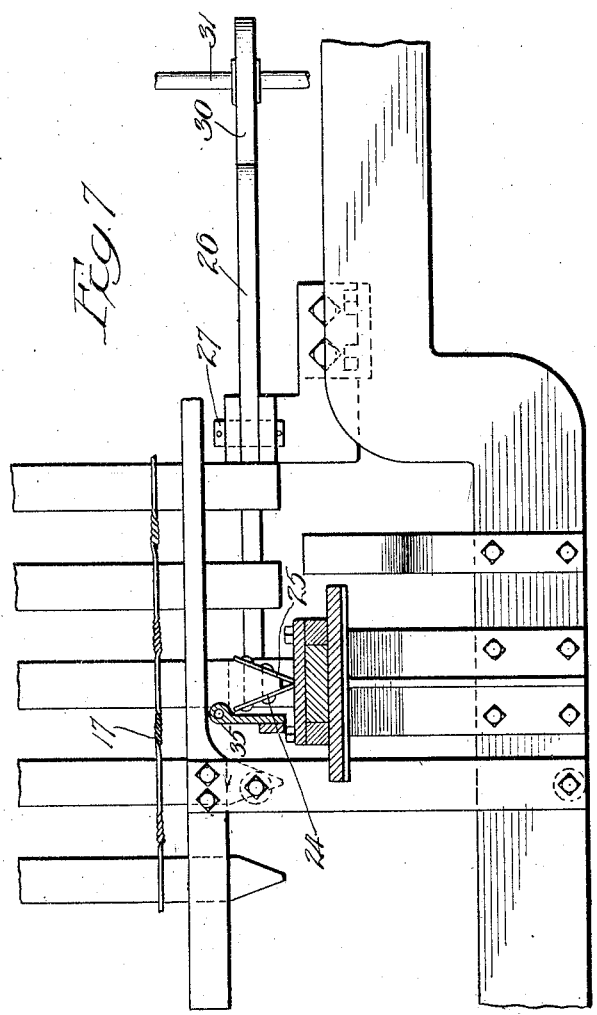

JOSEPH M. DENNING, OF DENVER, COLORADO.

FENCE-MACHINE.

1,340,530.  Specification of Letters Patent.  Patented May 18, 1920.

Application filed March 17, 1919. Serial No. 283,208.

*To all whom it may concern:*

Be it known that I, JOSEPH M. DENNING, a citizen of the United States, residing at Denver, in the county of Denver and State of Colorado, have invented certain new and useful Improvements in Fence-Machines, of which the following is a specification.

The present invention has to do with certain improvements in fence machines for manufacturing fence of that type in which vertical slats or pickets are held in position by longitudinal wires twisted or looped about them and holding them together. More particularly the invention has to do with improvements in a machine for manufacturing this kind of fence, in which machine provision is made for automatically pointing or otherwise specially forming the ends of the slats or pickets.

In order to facilitate an understanding and appreciation of the operation of the features of the present invention, I will first state that in the drawings and specification hereof, I have shown and will describe the features of the present invention as the same have been applied to a particular type of fence machine, being that shown in Letters Patent of the United States No. 943,008, which was issued to me December 14, 1909, for improvements in slat fence machines. I wish it distinctly understood, however, that in so illustrating and describing an application of the features of the present invention, I do so simply by way of illustration and for the purpose of facilitating a comprehension of the invention, and not by way of limitation.

Bearing the foregoing in mind, it will be understood that it is very desirable to point or otherwise specially shape or form the ends of the pickets or slats. If this pointing or special forming be done before the slats are woven into the completed fence, there is danger that the pointed or prepared ends may become broken or interfere with the proper functioning of the fence machine. On the other hand, it is difficult to operate on them after they have been woven into the fence. In any case, however, the use of a hand or manual operation for pointing or otherwise treating the pickets is an expensive operation and very materially increases the cost of manufacturing the completed fence.

One of the objects of the present invention is to provide in a fence machine adapted to manufacture this kind of fence means for automatically pointing or otherwise specially forming or treating the end portions of the pickets.

Another object in this connection is to so arrange and construct such an attachment that the rate of operation of the machine will not be impeded, but on the contrary so as to make it possible to maintain the full normal rate of operation for the production of completed fence.

Other objects and uses will appear from a detailed description of the invention which consists in the features of constructions and combinations of parts hereinafter described and claimed.

In the drawings:

Figure 1 shows a plan view of a fence machine having applied thereto the features of the present invention;

Fig. 2 shows a fragmentary side elevation of the pointing mechanism to which the present invention relates;

Fig. 3 is a fragmentary side elevation similar to Fig. 2, but looking in the opposite direction, being taken on the line 3—3 of Fig. 1, looking in the direction of the arrows and on enlarged scale, Fig. 3 showing the trimming mechanism standing in its initial or normal position;

Fig. 4 is a view similar to Fig. 3, with the exception that the trimming device has commenced to follow the movement of a slat in its progress toward the winding reel, the cutting blades having not yet come into cutting engagement with the slat;

Fig. 5 is a view similar to Fig. 4, with the exception that the operation has progressed an additional amount sufficient to completely sever the material from the end portion of the slat;

Fig. 6 is a view taken on the line 6—6 of Fig. 5, looking in the direction of the arrows; and Fig. 7 is a view taken on the line 7—7 of Fig. 6, looking in the direction of the arrows.

As previously stated the features of the present invention are shown for purposes of convenience as being applied to a fence machine of the type shown in Letters Patent of the United States No. 943,008. This machine includes suitable slat guides 10 and 11 on which raw slats 12 are carried, the same being fed by chains 13 and 14 to the feeding rollers 15 by which they are advanced lengthwise into the guides or heads 16. In conjunction with these guides or heads there is suitable twisting mechanism for twisting the strand wire 17 between the consecutive slats, so that a completed fence such as illustrated in Fig. 1 is produced. This fence is rolled into a suitable bundle carrier 18, so that by driving the bundle carrier, the fence is drawn toward the left or in the direction of the arrow in Fig. 1. This drawing operation may be either intermittent or continuous.

As will be observed from an examination of the slats lying on the guides 10 and 11, the same have plain or squared ends. It will be observed that, as the slats are rolled up into the roller or bundle carrier 18, they have been pointed or had their ends cut into special shape. I will now describe the mechanism by means of which this special cutting or pointing operation is performed in the normal course of operation of the machine.

An arm 19 is swingingly mounted in the machine adjacent to that point at which the pointing or cutting operation is to be performed. If, as in the construction illustrated, it is desired to point the slats after the fence has been completed, the cutting or pointing mechanism will be located adjacent to that portion of the fence machine in which the fence has been completed. In any other case, the pointing mechanism would, of course, be located at whatever location was desired with respect to the other mechanisms on the machine, and except as pointed out in the claims I do not limit myself to the location of the pointing mechanism at any specified position in the machine.

This arm 19 has its lower end pivoted at the point 20, so that it can move back and forth through a prescribed movement. The completed fence travels toward the left or in the direction of the arrow in Fig. 2, and the amount of movement provided for in the upper portion of the arm 19 will generally be somewhat greater than the distance between two consecutive slats 21 and 22 in said figure.

Slidably mounted in the upper portion of this arm 19 is a cutter block 23 having the cutting jaws 24 and 25 at its upper end. The upper edges of these jaws are sharpened to perform the cutting operation. A lever 26 pivoted at the point 27 has its outer end 28 connected to the cutter block 23 by means of a link 29, so that by swinging the lever 26, the cutter block will be moved up and down. A cam block 30 mounted on a shaft 31 operates on the end 32 of the lever arm 26 to raise the cutter block 23 once for each cycle of movements of the machine for the introduction of a slat. That is to say, the cam block 30 is so timed with respect to the other parts of the fence machine that the cutter block 23 will be actuated for the cutting operation once for each slat put into the fence. The cutter block 23 works between guides 33 and 34 on the arm 19, and, therefore, swings with said arm.

The upper end of the arm 19 carries a pin 35 which is slidably mounted in a guide block or the like 36 on the arm, said pin being normally forced downwardly by a spring 37. The pin 35 and guide block 36 are carried by a plate 38 on the upper end of the arm 19 and swing with said arm. When the pin 35 is projected into its lowermost position as controlled by the spring 37, it will stand in the path of travel of a slat moving through the machine, so that said slat will engage the pin and cause the arm 19 to rock owing to the travel of the fence through the machine until such time as the pin may be disengaged by being raised against the force of the spring 37. By this arrangement, therefore, the upper end of the arm 19 is caused to tilt or rock at exactly the same speed as that at which the fence is traveling through the machine. The parts are so proportioned and set with respect to each other that, as the arm 19 is rocked by reason of the engagement of the pin with the slat, the slat will stand at the correct position to be cut by the jaws 24 and 25 on the cutting block 23. Furthermore, the cam block 30 is so timed that the cutting block will be raised during the travel of the arm 19 with the slat 22, thus insuring that the cutting operation will be properly performed on the end of the slat notwithstanding the travel of the latter.

A spring 39 connects the upper portion of the arm 19 with the stationary member, so that said arm and the cutting mechanism will be restored to their initial position immediately after the disengagement of the pin 35 from the slat. Said pin is then allowed to assume the proper position, so that it will be engaged by the edge of the next slat, which by such engagement will again rock the arm 19 to enable the jaws to perform their cutting operation during the travel of the next slat. The disengagement of the pin 35 at the end of each cutting operation is effected in the following manner:

A short lever arm 40 is pivoted with respect to the arm 19 at the point 41, the outer end 42 of said lever working against the pin 35 or block connected to the same. Upon depressing the inner end 43 of the lever, it will be tilted so as to momentarily raise the pin and thus disengage the same from the slat, thereby allowing the arm 19 to immediately swing under the impulse of the spring 39 into position for operation on the next slat.

The tilting of the lever 40 is effected by a spring catch 44, the lower end of which is connected to the block 23 or the guide 34 thereof, so that as soon as the cutting jaws reach their uppermost movement, the catch 44 will snap over the end 43 of the lever 40, and thereafter when the cutting jaws have been lowered a sufficient distance the cam face of the spring catch 44 will engage said end 43, thereby tilting the lever 40 and disengaging the pin 35 from the slat after the cutting jaws have been lowered a sufficient distance to be disengaged from the slat itself. In this way there will be no interference between the disengagement of the cutting jaws from the slat and the backward swing of the arm 19.

In order to support the end portions during their travel past the cutting mechanism, I have provided a pair of guides 45 and 46 which have their end portions flared outwardly but for their central portions sufficiently close together to firmly support the slat during the cutting operation. It will also be observed particularly from an examination of Figs. 2, 3, 4, 5, and 6, that the cutting edges 24 and 25 are slanted, so that the cutting operation begins at one end and travels toward the other, thereby considerably reducing the amount of pressure which must be applied at the moment of cutting.

It is to be observed that in the particular construction of machine herein illustrated and described in detail the picket pointing mechanism or cutting devices travel with the slats during the cutting operations. These parts are so related that the cutting devices are centrally positioned with respect to the slats on which they are operating, thus insuring a central and even pointing of each slat. I wish it distinctly understood, however, that I do not limit myself to such a construction of machine except as I may do so in the claims since it is very evident that in many cases it would not be necessary to cause the cutting devices to travel with the slats, nor would it be necessary to perform the cutting or pointing operation during an interval of travel. It is further observed in this connection that the features of the invention are not limited to use in connection with either continuous or intermittent fence machines, since the important feature of the invention is to associate or combine with the slat fence machine suitable mechanism automatically operating to point the slats or otherwise cut their ends in order to deliver completed fence without having to resort to any manual operations for the cutting or pointing of the slats.

I claim:

1. In a machine of the class described, the combination with means for producing continuous fencing having longitudinal strand wires and cross slats and means for reeling the same as it is completed, of means forming the ends of the pickets, comprising cutting blades adapted to form the end portion of the picket, means for intermittently causing said blades to travel with a picket to be operated upon, and means for actuating the cutting blades during such travel, for the purpose specified.

2. In a machine of the class described, the combination with means for producing fencing having longitudinal strand wires and cross pickets, of means for forming the ends of the pickets, comprising coöperating jaws of suitable formation to provide the desired contour on the end of the picket, means for intermittently causing said jaws to travel with the pickets to be operated upon, and means for actuating the jaws during such travel, for the purpose specified.

3. In a machine of the class described, the combination with means for producing fencing having longitudinal strand wires and cross pickets, of means for forming the end portions of the pickets, comprising cutting devices of suitable form to give the desired contour to the pickets, means for causing said cutting devices to successively travel with the pickets to be operated upon, and means for actuating said cutting devices during each such travel, for the purpose specified.

4. In a machine of the class described, the combination with means for producing fencing having longitudinal strand wires and cross pickets, of cutting devices of suitable formation for providing the desired contour on the ends of the pickets, means for withdrawing completed fencing, means for temporarily associating the cutting devices with the end portion of each picket in succession during a portion of the travel thereof, means for actuating the cutting devices during such travel, and means for disengaging and retracting the cutting devices after the completion of the cutting operation, substantially as described.

5. In a machine of the class described, the combination with means for producing fencing having longitudinal strand wires and cross pickets, of means for forming the end portions of the pickets, comprising cutting devices, means for withdrawing the completed fencing, means for successively associating the cutting devices with the end portion of each picket to thereby cause the cutting devices to travel with the successive pickets, means for actuating the cutting devices during such travel, means for disengaging the associating devices after the completion of each cutting operation, and means for retracting the cutting devices after the completion of each cutting operation, substantially as described.

6. In a machine of the class described, the combination with means for producing fencing having longitudinal strand wires and cross pickets, of cutting devices for the end portions of the pickets, supporting means for said cutting devices permitting oscillation thereof, means tending to retract said supporting means to an initial position, means for temporarily associating the supporting means with each picket in succession to thereby cause the cutting devices to temporarily travel with the picket, and means for actuating the cutting devices during each such travel, substantially as described.

7. In a machine of the class described, the combination with means for producing fencing having longitudinal strand wires and cross pickets, of means for cutting the end portions of the pickets, comprising cutting devices, a swinging arm whereon they are mounted, means for retracting said swinging arm to an initial position, means for momentarily associating the swinging arm with each picket in succession, and means for actuating the cutting devices during the interval when it is so associated, substantially as described.

8. In a machine of the class described, the combination with means for producing fencing having cross pickets and means for withdrawing the completed fencing, of means for cutting the pickets, including the cutting devices, means for causing said cutting devices to travel with the pickets in succession, and means for actuating the cutting devices during each such travel, substantially as described.

9. In a machine of the class described, the combination of means for producing fencing having transverse pickets and means for withdrawing the completed fencing, of means for cutting the pickets in succession, comprising cutting devices, means for normally retracting the same to an initial position, means for causing the cutting devices to travel with the pickets in succession by the movement of the pickets themselves, and means for actuating the cutting devices during each such travel, substantially as described.

10. In a machine of the class described, the combination with means for producing fencing having transverse pickets and means for withdrawing the completed fencing, of means for cutting the pickets, comprising cutting devices, means for causing said cutting devices to travel in harmony with the pickets in succession, and means for actuating the cutting devices during each such travel, substantially as described.

11. In a machine of the class described, the combination with means for producing continuous fencing having longitudinal strand wires and cross slats from strand wires and previously cut pickets, and means for reeling the same as it is completed, of means for cutting the ends of the pickets at an angle with respect to the direction of travel through the machine comprising cutting blades adapted to perform such cutting operation, and means for actuating the cutting blades centrally with respect to each picket operated on, substantially as described.

12. In a machine of the class described, the combination with means for producing continuous fencing having longitudinal strand wires and cross slats from strand wires and previously cut pickets, and means for reeling the same as it is completed, of means for cutting the ends of the pickets at an angle to the direction of travel through the machine, and means for actuating said cutting means for each picket as the same passes a given portion of the machine, substantially as described.

JOSEPH M. DENNING.